United States Patent
Zhao

(10) Patent No.: US 11,646,042 B2
(45) Date of Patent: May 9, 2023

(54) DIGITAL VOICE PACKET LOSS CONCEALMENT USING DEEP LEARNING

(71) Applicant: Agora Lab, Inc., Santa Clara, CA (US)

(72) Inventor: Xiaohan Zhao, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 677 days.

(21) Appl. No.: 16/667,413

(22) Filed: Oct. 29, 2019

(65) Prior Publication Data

US 2021/0125622 A1     Apr. 29, 2021

(51) Int. Cl.
    *G10L 19/00*     (2013.01)
    *G10L 19/16*     (2013.01)
    (Continued)

(52) U.S. Cl.
CPC .......... *G10L 19/167* (2013.01); *G10L 19/005* (2013.01); *G10L 19/0204* (2013.01);
(Continued)

(58) Field of Classification Search
CPC ....... G10L 15/30; G10L 25/30; G10L 15/063; G10L 15/16; G10L 19/00; G10L 2019/0003; G10L 2019/0011; G10L 2019/0012; G10L 2019/0016; G10L 19/0017; G10L 19/0018; G10L 19/002; G10L 19/012; G10L 19/02; G10L 19/0204; G10L 19/0208; G10L 19/028; G10L 19/025; G10L 19/022; G10L 19/03; G10L 19/04; G10L 19/07; G10L 19/06; G10L 19/08; G10L 19/083; G10L 19/087; G10L 19/09; G10L 19/093; G10L 19/097; G10L 19/10; G10L 19/107; G10L 19/113; G10L 19/12; G10L 19/125; G10L 19/13; G10L 19/135; G10L 19/18; G10L 19/20;
(Continued)

(56) References Cited

U.S. PATENT DOCUMENTS

| | | | |
|---|---|---|---|
| 8,428,959 B2 * | 4/2013 | Chu | G10L 19/005 704/219 |
| 10,475,456 B1 * | 11/2019 | Bhatia | G10L 19/005 |

(Continued)

OTHER PUBLICATIONS

G. Mittag and S. Möller, "Single-Ended Packet Loss Rate Estimation of Transmitted Speech Signals," 2018 IEEE Global Conference on Signal and Information Processing (GlobalSIP), 2018, pp. 226-230. (Year: 2018).*

(Continued)

*Primary Examiner* — Edgar X Guerra-Erazo
(74) *Attorney, Agent, or Firm* — Young Basile Hanlon & MacFarlane, P.C.

(57) ABSTRACT

A method for recovering a current frame of an audio stream includes detecting that a current packet is lost, the current packet including an audio signal; splitting one or more frames into respective high-band signals and respective low-band signals, the one or more frames precede the current frame in the audio stream; inferring a current low-band signal of the current frame using, as inputs to a machine-learning model, the respective low-band signals; combining the inferred current low-band signal with the respective high-band signals to obtain the current frame; and adding the current frame to a playout buffer.

20 Claims, 10 Drawing Sheets

(51) Int. Cl.
  *H04L 47/32* (2022.01)
  *G10L 19/02* (2013.01)
  *G10L 19/028* (2013.01)
  *G10L 19/005* (2013.01)
  *G10L 25/21* (2013.01)

(52) U.S. Cl.
  CPC ............ *G10L 19/028* (2013.01); *G10L 25/21* (2013.01); *H04L 47/32* (2013.01)

(58) Field of Classification Search
  CPC ....... G10L 19/22; G10L 19/24; G10L 19/265; G10L 19/26; G10L 21/00; G10L 21/02; G10L 21/0208; G10L 2021/02085; G10L 2021/02082; G10L 21/0224; G10L 21/0232; G10L 21/0272; G10L 21/028; G10L 21/0308; G10L 21/038; G10L 21/0388; G10L 21/057; G10L 25/27; G06N 20/00; G06N 3/0454; G06N 3/08; G06N 3/02; G06N 5/04; G06N 3/04
  See application file for complete search history.

(56) References Cited

U.S. PATENT DOCUMENTS

| | | | | |
|---|---|---|---|---|
| 10,741,192 | B2* | 8/2020 | Rajendran | G10L 25/18 |
| 10,779,012 | B2* | 9/2020 | Zhong | H04N 19/895 |
| 2011/0191111 | A1* | 8/2011 | Chu | G10L 19/005 |
| | | | | 704/500 |
| 2016/0372122 | A1* | 12/2016 | Zhang | G10L 19/06 |
| 2019/0341067 | A1* | 11/2019 | Rajendran | G10L 25/30 |
| 2020/0402529 | A1* | 12/2020 | Olivieri | H04L 65/612 |

OTHER PUBLICATIONS

W. B. Kleijn et al., "Wavenet Based Low Rate Speech Coding," 2018 IEEE International Conference on Acoustics, Speech and Signal Processing (ICASSP), 2018, pp. 676-680. (Year: 2018).*

T. Okamoto, K. Tachibana, T. Toda, Y. Shiga and H. Kawai, "Subband wavenet with overlapped single-sideband filterbanks," 2017 IEEE Automatic Speech Recognition and Understanding Workshop (ASRU), 2017, pp. 698-704. (Year: 2017).*

K. Li and C. Lee, "A deep neural network approach to speech bandwidth expansion," 2015 IEEE International Conference on Acoustics, Speech and Signal Processing (ICASSP), 2015. (Year: 2015).*

Lee, B. K., Hwang, I., Park, J., & Chang, J. H. (2014). Enhanced Muting Method in Packet Loss Concealment of ITU-T G. 722 Using Sigmoid Function with On-line Optimized Parameters. In Fifteenth Annual Conference of the International Speech Communication Association. (Year: 2014).*

Liu, X., Bao, CC. Audio bandwidth extension based on temporal smoothing cepstral coefficients. J Audio Speech Music Proc. 2014, 41 (2014). (Year: 2014).*

N. Ramakrishnan and T. Soni, "Network Traffic Prediction Using Recurrent Neural Networks," 2018 17th IEEE International Conference on Machine Learning and Applications (ICMLA), 2018. (Year: 2018).*

Lotfidereshgi R et al. Speech Prediction Using an Adaptive Recurrent Neural Network with Application to Packet Loss Concealment, 2018 IEEE International Conference on Acoustics, Speech and Signal Processing (ICASSP], Apr. 15, 2018-Apr. 20, 2018, pp. 5394-5398. Calgary, AB, Canada.

Lee B K et al. Packet Loss Concealment Based on Deep Neural Networks for Digital Speech Transmission [J], IEEE/ACM Transactions on Audio, Speech, and Language Processing, Feb. 24, 2016, pp. 378-387.

* cited by examiner ns of this disclosure.
DIGITAL VOICE PACKET LOSS CONCEALMENT USING DEEP LEARNING

TECHNICAL FIELD

This disclosure relates generally to audio processing and more specifically to packet loss concealment.

BACKGROUND

In many applications, such as voice over Internet Protocol (VoIP), audio streaming, digital audio conferencing, and the like, audio data may be digited, packetized, and transmitted, from a transmitting station to a receiving station, over an asynchronous transmission channel, such as an Internet Protocol (IP) network. An IP network is typically a best-effort network. Packets transmitted over the network may be lost and/or delayed. Concealment of (e.g., compensation for) such packet loss or delay is desirable for a smooth listening experience at the receiving station.

Different techniques have been employed at receiving stations to compensate for lost and/or delayed packets. Such techniques fall under the umbrella of packet loss concealment (PLC).

SUMMARY

Disclosed herein are implementations of packet loss concealment (PLC); more specifically, implementations of PLC using machine learning (e.g., deep learning) and post-processing to mitigate the impact of packet loss.

A first aspect is a method for recovering a current frame of an audio stream. The method includes detecting that a current packet is lost, the current packet including an audio signal; splitting one or more frames into respective high-band signals and respective low-band signals, the one or more frames precede the current frame in the audio stream; inferring a current low-band signal of the current frame using, as inputs to a machine-learning model, the respective low-band signals; combining the inferred current low-band signal with the respective high-band signals to obtain the current frame; and adding the current frame to a playout buffer.

A second aspect is an apparatus for recovering a current frame of an audio stream. The apparatus includes a memory and a processor. The processor is configured to execute instructions stored in the memory to detect that a current packet is lost, the current packet including an audio signal of the audio stream; split one or more frames preceding the current frame into respective high-band signals and respective low-band signals; infer a current low-band signal using the respective low-band signals as inputs to a machine-learning model; combine the inferred current low-band signal with the respective high-band signals to obtain the current frame; and add the current frame to a playout buffer.

A third aspect is an apparatus for recovering a current frame of an audio stream. The apparatus is configured to detect that a current packet is lost; recover the current frame corresponding to the current packet using a machine-learning model; add noise to the current frame based on an energy level in a previous frame that immediately precedes the current frame in the audio stream; and smooth the current frame in at least one of a time-domain or a frequency domain.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
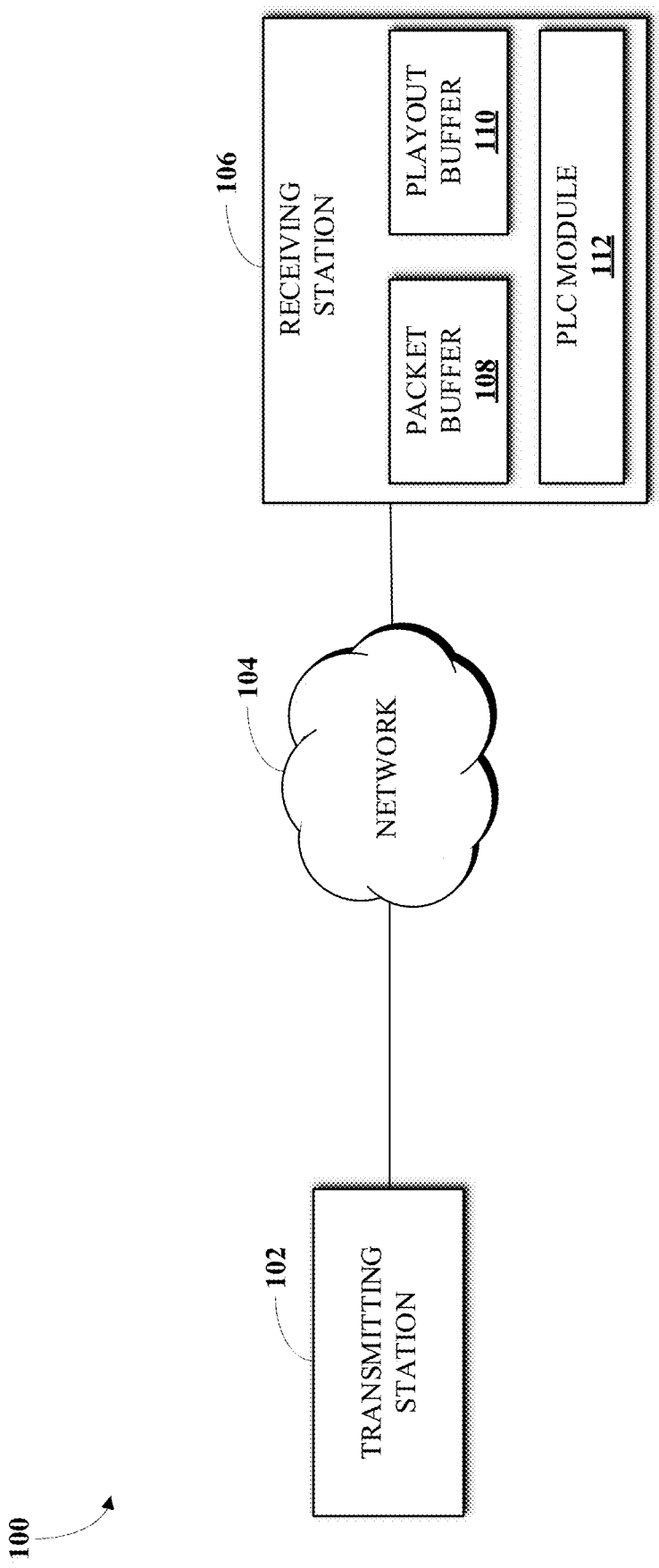
FIG. 1 is a schematic of an example of an audio encoding and decoding system.

Digital voice transmission requires real-time and reliable delivery of small-sized sequential packets. The receiving station receives a steady stream of packets for decoding. However, during transmission of the packets over an asynchronous network, such as an IP network, one or more of the packets can be lost or delayed due, for example, to network traffic (i.e., network congestion). A lost packet can be a packet that is never received at the receiving station. A delayed packet can be a packet that is received out of its expected order and/or received after a time where it could still be processed (e.g., decoded for playing) by the receiving station. When a packet is lost, and unless some special techniques are used, it may not be possible to retransmit the lost packet from the transmitting station to the receiving station. Consequently, discontinuity of packets will occur.

Various techniques, such as Forward Error Correction (FEC), have been suggested to recover or conceal lost packets, via packet loss concealment (PLC) schemes, which may be implemented by a receiving station (i.e., a receiver). Most VoIP systems rely on receiver-based PLC schemes. Receiver-based PLC can be classified as insertion-based, interpolation-based and regeneration-based methods. When the audio decoder at the receiving station detects that a receiving buffer is empty, implying that the packets which should follow the previous packets have either been lost or delayed, a PLC processor can be activated.

Unlike most existing PLC methods, implementations according to this disclosure can employ machine learning (ML) models, such as deep learning (DL) models, combined with post-processing to mitigate the impact of packet loss.

Implementations according to this disclosure use frames already in the playout buffer, or characteristics thereof, as inputs to a ML model to infer (i.e., predict, derive, recover, etc.) the audio contents (i.e., referred to herein as recovered frames or inferred frames) that are contained in lost packets.

In some implementations, post-process (i.e., post-recovery) smoothing of the recovered frames can be performed. That is, after a lost frame is recovered, the recovered frame can be smoothed. In some examples, as further described below, time-domain smoothing can be performed. In some other examples, time- and frequency-domain smoothing can be performed.

More specifically, using the low-band parts (i.e., signals) of previous frames in the audio stream, the ML model infers the low-band part of a lost frame. Only the low-band part of the signal is inferred because the high-band part of an audio signal has a much lesser impact on voice quality. The inferred low-band part is then combined with the high-band part of the previous frames. In some examples, the recovered frame can be smoothed in at least one of the time domain and/or the frequency domain.

The time-domain based predictor (i.e., the machine-learning model) disclosed herein only relies on a few frames (e.g., 2 previous frames), which leads to higher quality voice, less time delay and less computation complexity as compared with other deep-learning-based PLC techniques.

It is noted that details of machine learning, neural networks, and/or details that are known to a person skilled in the art are omitted herein. For example, a skilled person in the art recognizes that the values of the weights of connections between nodes (i.e., neurons) in a neural network are determined during the training phase. Accordingly, such are not discussed in detail herein.

A typical deep learning network can be composed of a number of operations (e.g., convolutional operations), which may be referred to, collectively, as feature-extraction layers, followed, optionally, by a number of fully connected layers. The number of operations of each type and their respective sizes is typically determined during the training phase of the machine learning. As a person skilled in the art recognizes, additional layers and/or operations can be included. For example, combinations of Pooling, MaxPooling, Dropout, Activation, Normalization, BatchNormalization, and other operations can be grouped with convolution operations and/or the fully connected operation. The fully connected layers may be referred to as Dense operations. As a person skilled in the art recognizes, a convolution operation can use a SeparableConvolution2D or Convolution2D operation.

As my be used in this disclosure, a convolution layer can be a group of operations starting with a Convolution2D or SeparableConvolution2D operation followed by zero or more operations (e.g., Pooling, Dropout, Activation, Normalization, BatchNormalization, other operations, or a combination thereof), until another convolutional layer, a Dense operation, or the output of the ML model is reached. Similarly, a Dense layer can be a group of operations or layers starting with a Dense operation (i.e., a fully connected layer) followed by zero or more operations (e.g., Pooling, Dropout, Activation, Normalization, BatchNormalization, other operations, or a combination thereof) until another convolution layer, another Dense layer, or the output of the network is reached. The boundary between feature extraction based on convolutional networks and a feature classification using Dense operations can be marked by a Flatten operation, which flattens the multidimensional matrix from the feature extraction into a vector.

In a typical DL model, some of the layers may consist of a set of filters. While a filter is applied to a subset of the input data at a time, the filter is applied across the full input, such as by sweeping over the input. The operations performed by this layer are typically linear/matrix multiplications. The output of a filter may be further filtered using an activation function. The activation function may be a linear function or non-linear function (e.g., a sigmoid function, an arcTan function, a tan H function, a ReLu function, or the like).

Each of the fully connected operations is a linear operation in which every input is connected to every output by a weight. As such, a fully connected layer with N number of inputs and M outputs can have a total of N×M weights. As mentioned above, a Dense operation may be generally followed by a non-linear activation function to generate an output of that layer.

Figure 2:
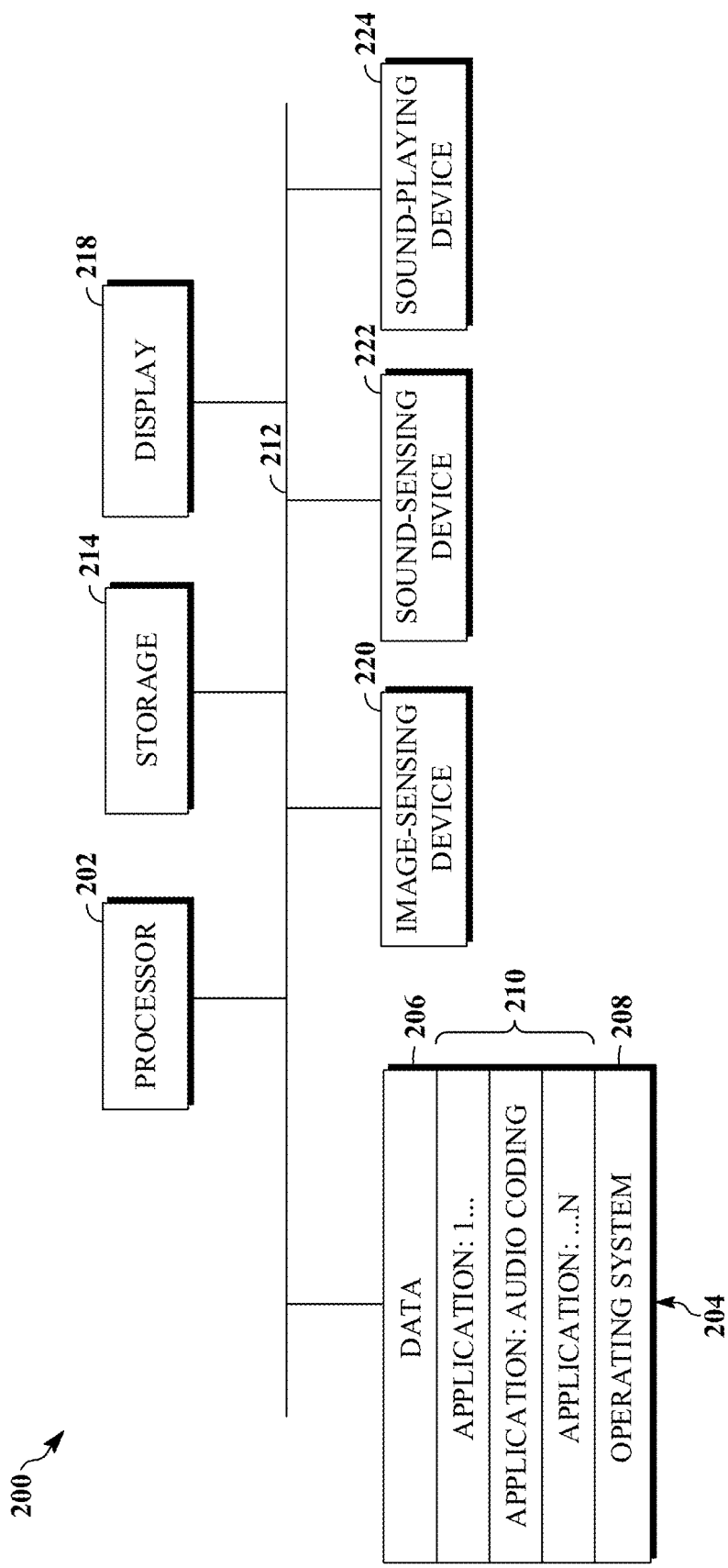
FIG. 2 is a block diagram of an example of a computing device that can implement a transmitting station or a receiving station.

Further details of techniques for digital voice packet loss concealment using deep learning are described herein with initial reference to a system in which they can be implemented, as shown in FIGS. 1 and 2.

FIG. 1 is a schematic of an example of an audio encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of an audio stream. Specifically, the audio stream can be encoded in the transmitting station 102, and the encoded audio stream can be decoded in the receiving station 106. The network 104 can be, for example, an IP network, such as the Internet. The network 104 can also be a local area network (LAN), wide area network (WAN), virtual private network (VPN), cellular telephone network, or any other means of transferring the audio stream from the transmitting station 102 to, in this example, the receiving station 106.

In an example, the transmitting station 102 may be coupled to a microphone (not shown). Via the microphone, the transmitting station 102 can receive an analog audio signal. The transmitting station 102 can digitize the analog audio signal via sampling (for example, at a sampling rate of 8000 Hz). Every N samples of the digitized audio signal can be encoded, using an audio encoder (not shown), into audio data and formed into a packet. In an example, the audio encoder can be a lossy encoder. In an example, the audio encoder can be a lossless encoder. The transmitting station 102 transmits each packet to the receiving station 106 over the network 104. In an example, each packet can include audio data corresponding to one segment (i.e., a frame) of audio. In an example, the frame can correspond to an m number of milliseconds of audio. In an example, m can be 20 milliseconds.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

In one implementation, the receiving station 106 receives (e.g., via the network 104, a computer bus, and/or some communication pathway) the encoded audio stream and stores the audio stream for later decoding. In an example implementation, a real-time transport protocol (RTP) is used for transmission of the encoded audio over the network 104. In another implementation, a transport protocol other than RTP may be used (e.g., a Hypertext Transfer Protocol-based (HTTP-based) audio streaming protocol).

When used in a conferencing system (e.g., audio and/or audio and video conferencing system), for example, the transmitting station 102 and/or the receiving station 106 may include the ability to both encode and decode an audio stream as described below. For example, the receiving station 106 could be an audio conference participant who receives an encoded audio bitstream from an audio conference server (e.g., the transmitting station 102) to decode and listen to and further encodes and transmits his or her own audio bitstream to the audio conference server for decoding and playing by other participants.

While not specifically shown, the receiving station can include an audio decoder. The audio decoder can receive packets containing compressed (i.e., encoded) audio data, un-compress (i.e., decode) the packets to form playable (such as via a speaker) audio frames. In an example, the packets can include residual audio data. The residual audio data can include differences between a current audio frame and some other already decoded frame(s). In another example, the residual data can include differences between a small subset of samples of the current frame and the remaining samples of the current frame.

A packet buffer 108 can be used to store received packets from the transmitting station 102. The decoder decodes a packet from the packet buffer to form a frame. The frame is then placed in a playout buffer 110 until the time to play the frame arrives. A PLC module 112 detects that a packet is lost and predicts the contents of the audio data (i.e., a frame) contained in the lost packet. The PLC module 112 can implement or perform one or more of the techniques disclosed herein.

FIG. 2 is a block diagram of an example of a computing device 200 that can implement a transmitting station, such as the transmitting station 102 of FIG. 1, or a receiving station, such as the receiving station 106 of FIG. 1. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage devices can be used as the memory 204. The memory 204 can include code and data 206 that are accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include an audio coding application that performs the techniques described herein. The computing device 200 can also include a secondary storage 214, which can, for example, be a memory card used with a mobile computing device. Where the audio communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200. The computing device 200 can also include or be in communication with a sound-playing device 224, for example, a speaker, a headset, or any other sound-playing device now existing or hereafter developed that can play sounds as directed by the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
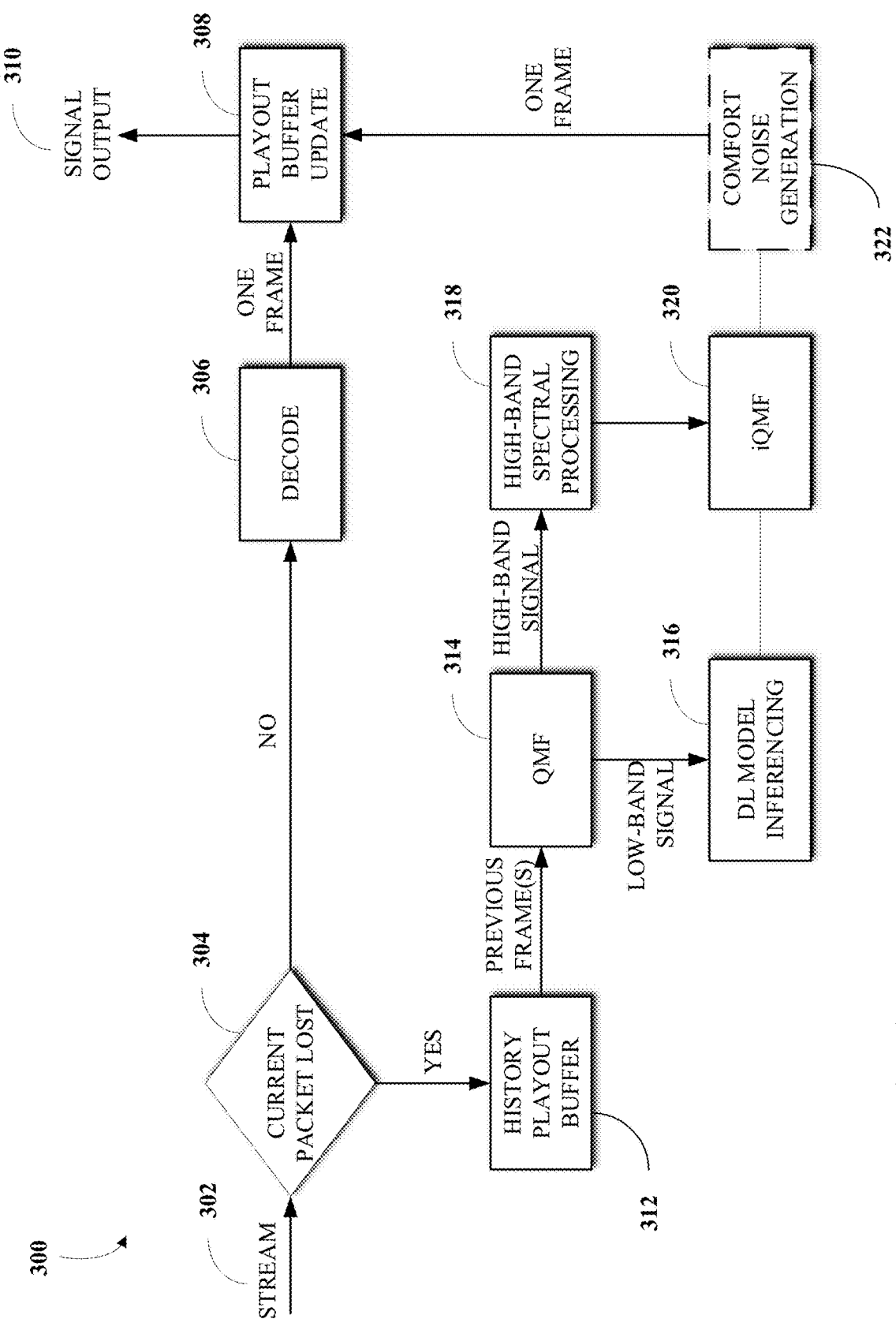
FIG. 3 is an example of a technique for packet loss concealment in accordance with implementations of this disclosure.

FIG. 3 is an example of a technique 300 for packet loss concealment in accordance with implementations of this disclosure. The technique 300 can be implemented by a receiving station, such as the receiving station 106 of FIG. 1. The technique 300 can be implemented by a PLC module, such as the PLC module 112 of FIG. 1. The technique 300 can be implemented by a computing device, such as the computing device, such as the computing device 200 of FIG. 2. The technique 300 can be stored as executable instructions in a memory, such as the memory 204 of FIG. 2. The executable instructions can be executed by a processor, such as the processor 202 of FIG. 2, to implement (e.g., perform) the steps of the technique 300. The technique 300 can be implemented as one or more hardware modules that can be configured to execute one or more of the steps of the technique 300.

In the case that a packet is detected to be lost, as further described below, the technique 300 uses frames already in the playout buffer, or characteristics thereof (i.e., the low-band portions thereof), as inputs to a ML model to infer (i.e., predict, derive, recover, etc.) the audio contents (i.e., the current frame) that are contained in the lost packet. An example of an implementation of the ML model is described with respect to FIG. 4.

The technique 300 can be summarized as follows. The technique 300 estimates only the low-band part of a lost packet whereas the technique 300 keeps the high-band part as the same as previous frame(s). By doing so, the computation burden of the technique 300 and memory size required by the technique 300 can be reduced. Once the missing low-band signal is estimated, the technique 300 combines the low-band part with the high-band part of the previous frame(s), via an inverse filter, such as the inverse Quadrature Mirror Filter (iQMF), to form a completely recovered frame. Before (or after) the recovered frame (i.e., the current frame) is added the playout buffer, the current frame can be smoothed in at least one of the time domain or frequency with adjacent frames.

The technique 300 can receive an audio stream 302. In an example, the audio stream can be received from a transmitting station, such as the transmitting station 102 of FIG. 1. The audio stream can be received as packets. Each packet can include audio data (i.e., audio frames). For simplicity of explanation, a packet can be assumed to include a smallest playable segment of audio (i.e., a frame). In an example, a frame can correspond to 20 milliseconds of playable audio. However, the disclosure is not so limited and the frame can correspond to more or fewer milliseconds of audio.

Figure 8:
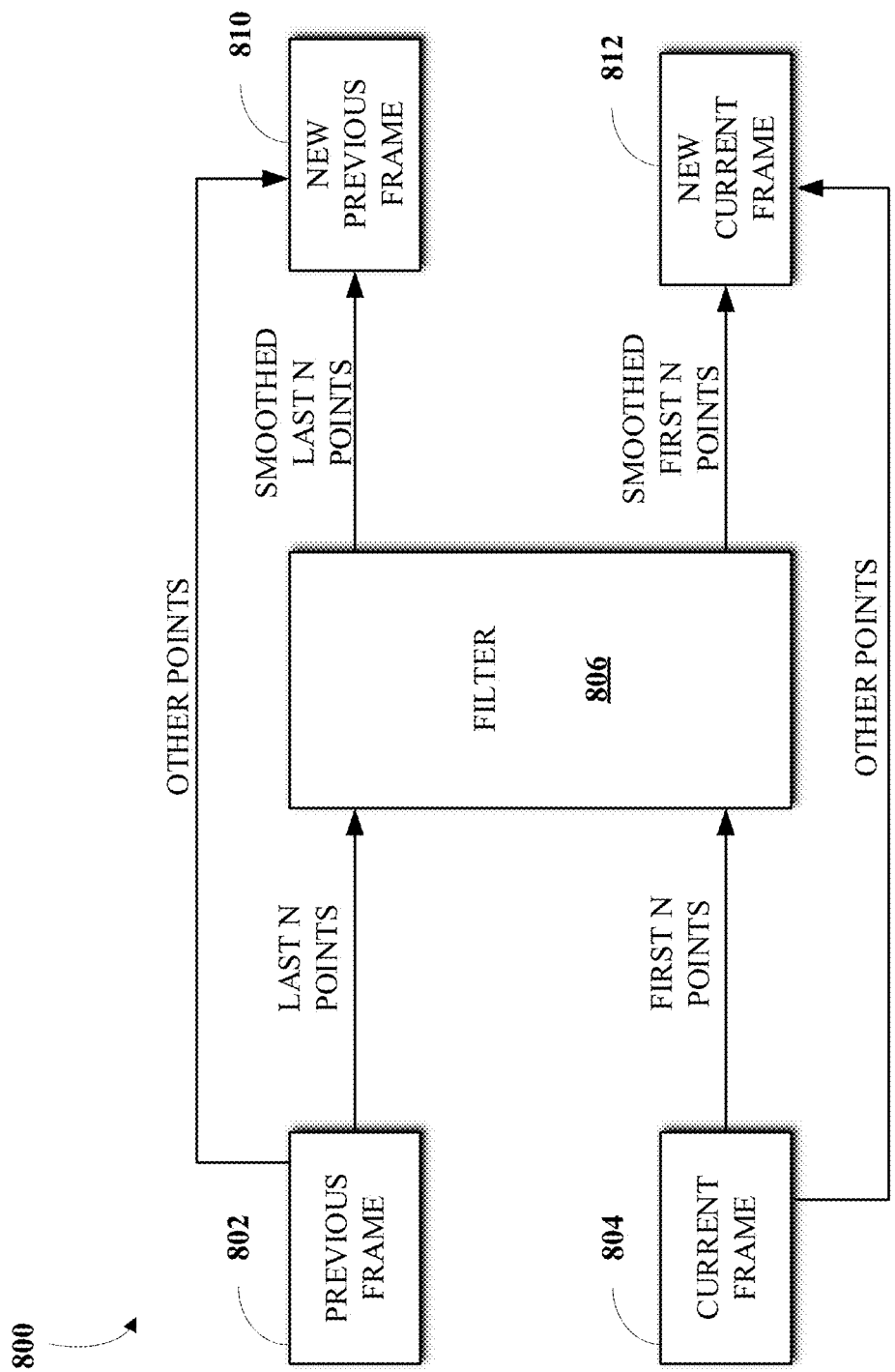
FIG. 8 is a diagram of a flowchart of a technique for time-domain smoothing in accordance with implementations of this disclosure.

The packets of the audio stream 302 can be inserted in a packet buffer, such as the packet buffer 108 of FIG. 8. Each packet of the audio stream 302 can be numbered. As such, for example, the packets of the audio stream 302 can be sequentially numbered.

At 304, the technique 300 detects whether a packet is lost. For ease of reference, a packet that is detected to be lost is referred to a current packet.

In an example, the current packet is detected to be lost when a next received packet does not have an expected sequence number. For example, assume that an immediately preceding packet has a sequence number of seq_num. If a packet number having the sequence number seq_num+1 is not received, then the current packet is considered lost.

In another example, the current packet can be detected to be lost at the time that the current packet is to be decoded. As mentioned above, packets may be received out of order. To account for network jitter, for example, packets are accumulated in the packet buffer 108 before being passed to the decoder for decoding. The current packet can be detected to be lost at the time that the current is to be passed to the decoder. For example, if the packet with seq_num+1 is to be passed to the decoder but no such packet is in the packet buffer 108, then the current packet can be detected to be lost.

If the current packet is not detected to be lost, the current packet can be passed to decoder, and at 306, the technique 300 can decode the packet. Decoding the current packet can mean reconstructing and/or reconstituting the audio data in the packet to form the audio frame. At 308, the technique 300, can add the frame to a playout buffer and update the frame buffer, such as the playout buffer 110 of FIG. 1. Updating the frame buffer is further described below with respect to FIGS. 6-9. From the playout buffer, the frames therein can be output, such as via a speaker, as shown by a signal output 310.

If, at 304, the current packet is detected to be lost, then the technique 300 proceeds to 312 to recover (i.e., infer, derive, etc.) the content of the lost packet. As mentioned above, the technique 300 uses a machine learning model to recover the content of the lost packet. An example of a ML model is described with respect to FIG. 4.

Figure 4:
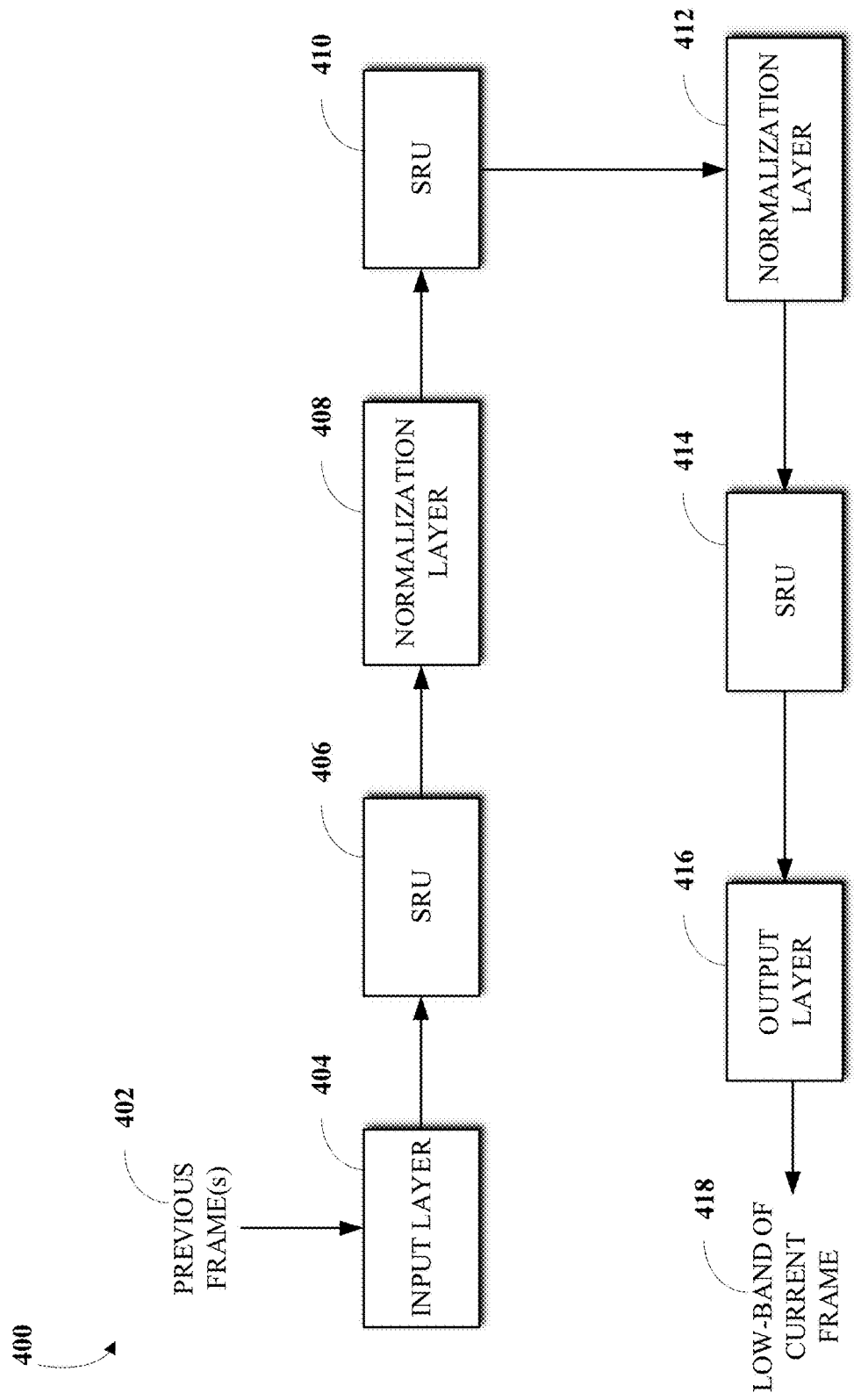
FIG. 4 is an example of a machine learning model for packet loss concealment in accordance with implementations of this disclosure.

FIG. 4 is an example 400 of a machine learning model for packet loss concealment in accordance with implementations of this disclosure.

Machine learning can be well suited to address computationally complex and/or time consuming problems in audio coding. As is known, there are typically two phases to machine learning: a training phase and an inference phase. The training phase is typically an off-line phase that is used to derive a model. In the case of, for example, a deep learning neural network model, deriving the model can mean deriving the parameters of the model. The parameters of the model can include weights between nodes of the model; the number of hidden layers; the different types and numbers of operations of model; and the like. The model is then used on-line to infer (e.g., recover) an output from certain inputs.

An audio stream is temporal sequence of audio frames. As audio data is continuous data where a next frame is a continuation of previous frames, an ML model according to implementations of this disclosure can include recurrent layers. As such, the example 400 can include one or more recurrent layers. Nodes of recurrent layers can have memory (i.e., a state). The node states enable recurrent layers to process sequences of inputs and exploit redundancies, similarities, and/or continuity in sequential data. More generally, a ML model according to implementations of this disclosure can include, but is not limited to, zero or more long/short term memory (LSTM) layers, gated recurrent units (GRU) layers, simple recurrent units (SRU) layers, and other recurrent layers, among other layers. The ML model disclosed herein can process a time domain signal directly.

The example 400 is shown as including an input layer 404, SRU layers 406, 410, 414, normalization layers 408, 412, and an output layer 416. However, other network structures are possible depending, for example, on the application of the ML model. For example, the structure (e.g., depth, number of parameters, number of layers, etc.) of the model can be tailored to the platform (e.g., device) in which the ML model is to be used. For example, a lower end device (e.g., a mobile phone) may not be as capable (e.g., in terms of memory and/or compute power) as a higher end device (e.g., a desktop or a server computer). As such, an ML model according to implementations of this disclosure that is to be used on a lower end device can be less complex than another ML model to be used on a higher end device. As such, the complexity of the ML model can be a balancing of resources versus ML model output quality.

At the input layer 404, previous frames 402 are received. More specifically, the low-band portions of previous frames 402 are received. For example, if the previous frames 402 includes 2 frames and each frame includes 160 low-band samples, then 320 inputs are received at the input layer 404.

Including three SRU layers (i.e., the SRU layers 406, 410, 414) in the ML model can provide adequate prediction accuracy. While more SRU layers may lead to improved prediction accuracy, the model can become too complex to be practically useful on a lower-end device, such as a cell phone. On the other hand, fewer than three SRU layers can lead to low prediction accuracy.

The normalization layers 408, 412 normalize the inputs of each layer in such a way that they have a mean output activation of zero and a standard deviation of one. As the name implies, the normalization layers 408, 412 turns the distribution of the activation weights into a Gaussian distribution. Using normalization layers is a technique that can make the ML model more efficient and enable the ML model to learn faster. A normalization layer can be inserted between some pairs of SRU layers. As such, the normalization layer 408 is inserted between the SRU layer 406 and the SRU layer 410; and the normalization layer 412 is inserted between the SRU layer 410 and the SRU layer 414.

The output layer 416 can be a fully connected (i.e., Dense) layer. The activation function of the output layer can be the tan H function. Tan H can be a suitable activation function because the output values of the example 400 range from −1 to 1, which is the range of audio signals. However, other activation functions can be used. The output of the output layer 416 is the low-band signal of the predicted frame (i.e., a frame portion 418).

The training data can be used, during a training (i.e., learning) phase of machine learning, to derive (e.g., learn, infer, etc.) the machine-learning (ML) model that is (e.g., defines, constitutes, etc.) a mapping from the input data to an output. Herein, the input data can be one or more frames that are proximal in to time to the lost frame and the output can be the lost frame. More specifically, the input data can be the low-band signals of the one or more frames.

In an example the input data includes an N number of input frames. In an example, N can be 2. In an example, the input frames can be the frames immediately preceding the lost frame (also referred to the current frame). In an example, the input frames can include frames that precede the current frame and frames that come after the current frame. For example, N/2 (e.g., 2/2=1) immediately preceding frames and N/2 immediately succeeding frames can be used as input. In another example, the input frames can be frames that immediately follow the current frame.

A vast amount of training data can be available. The training data can be available audio streams. Some packets can be removed from the available audio streams. The removed packets are the ground truth packets that the ML model attempts to learn (e.g., infer) during the training phase. The loss function used in the training of the ML model can be the mean absolute error (MAE) between the ML model prediction (i.e., the output of the ML model) and the ground truth signal. More specifically, and as further described below, the loss function can be the MAE between the low-band part of the ground truth frame and the ML model prediction, which is a low-band signal prediction. Other loss functions can also be used. For example, the mean square error (MSE), the sum of absolute differences (SAD), or some other error measure can be used.

As mentioned above, the ML model is trained to infer the low-band part of the lost frame. The ML model is trained to infer the low-band part using the low-band parts of the input data. As such, the low-band parts of the input frames are extracted and used as input to the input layer.

The frames to be used as input can be split into their constituent low-band and high-band parts. In an example, a filter bank can be used to split the audio signal contained in the input frames into a number of sub-band signals. In an example, the filter bank can be the quadrature-mirror filter (QMF). In an example, the low-band signal can correspond to the 0-8 kHz signal that is contained in the input frames and the high-band signal can correspond to at least a portion of the remaining signal (e.g., a 8-16 kHz signal) of the input frames.

Returning again to FIG. 3, the technique 300, which uses the trained ML model described above, retrieves an N number of frames from a playout buffer, such as the playout buffer 110 of FIG. 1. As mentioned above, in an example, N can equal 2. In an example, the N frames can be frames adjacent to the current frame. In an example, the N frames can be the two frames immediately preceding the current frame. For example, if the current frame were to correspond to a packet numbered seq_num, then the N frames can be the frames corresponding to (i.e., decoded from or inferred from) packets with sequence numbers seq_num-1, seq_num-2, . . . , seq_num-N.

At 314, the technique 300 uses a filter bank, such as a QMF filter, to split each of the N frames into respective low-band signals and respective high-band signals. The respective low-band signals of the N frames are used as input to 316, which is an ML model as described with respect to FIG. 4. At 316, the ML model outputs a predicted low-band signal (i.e., current low-band signal or current low-band part) for the current frame.

The respective high-band signals generated at 314 are forwarded to 318. At 318, the high-band signal from the last frame can be repeated (e.g., copied). In an example, the high-band signal can be repeated with a gain. In an example, the gain can be less than 1.0. In an example, the gain can be less than 1 but more than 0. At 320, the technique 300 uses an inverse filter, such as an inverse QMF (iQMF) to combine the processed high-band signal and the current low-band filter into the current frame.

Figure 5:
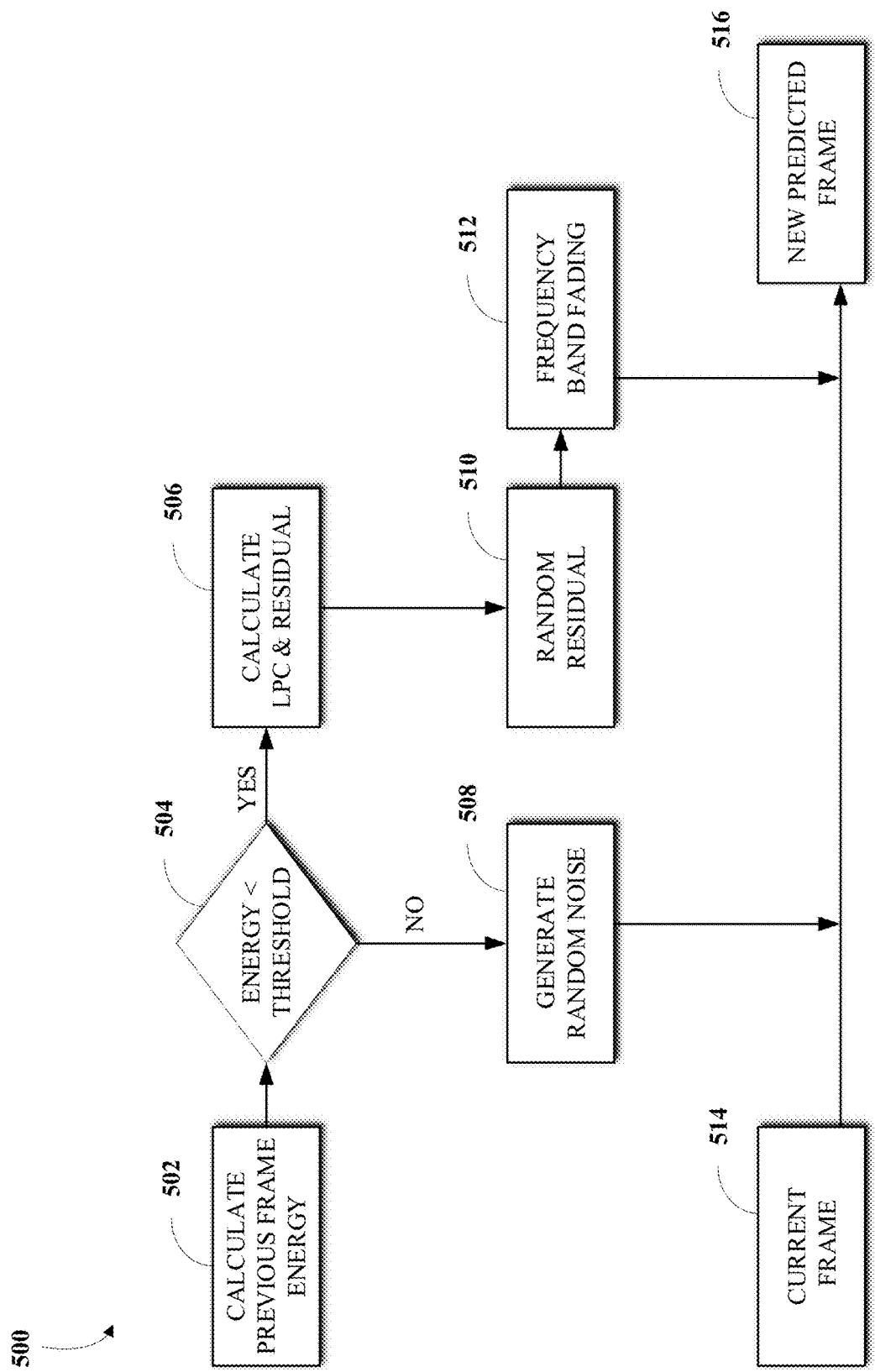
FIG. 5 is an example of a flowchart of a technique for adding noise in accordance with implementations of this disclosure.

In an example, at 322, the technique 300 can optionally add noise to the current frame to provide a more naturally sounding audio frame. FIG. 5 is an example of a flowchart of a technique 500 for adding noise in accordance with implementations of this disclosure.

The technique 500 can be summarized as follows. In some cases, such as in the case of prediction of a voiceless consonant, the ML model may not produce a very accurate prediction (i.e., a very accurate current frame). To cope with this, a comfortable noise model is developed, as further described below with respect to Linear Predictive Coding (LPC). When the immediately preceding frame of the current frame is in a low-energy state, a comfortable noise with the same energy level is compensated on the predicted frame. To avoid high frequency noise, the high-band of randomized residual can be suppressed by a low-pass filter, which is referred to herein as frequency-band fading.

At 502, the technique 500 calculates the energy of the frame immediately preceding the current frame. As mentioned above, the frame immediately preceding the current frame can be obtained from the playout buffer. The energy can be indicative of the average amplitude of the audio signal in the frame immediately preceding the current frame. That is, for example, if the audio frame includes someone speaking in a loud voice, then the energy of the frame would be high. In an example, the energy can be calculated as the sum of the squares of the audio samples of the frame immediately preceding the current frame. For example, assuming that the frame immediately preceding the current frame is denoted by samples $\{x_i\}$ for $i=1, \ldots$, number of samples, then the energy can be calculated as energy=$\Sigma_{i=1}^{number\ of\ samples} x_i^2$.

At 504, if the energy is smaller than a threshold, then the technique 500 proceeds to 506. Otherwise, if the energy is greater than or equal to the threshold, then the technique 500 proceeds to 508. The threshold can correspond to a low energy value. In an example, the threshold can be 0.015, which is a threshold that is empirically derived. However, other threshold values are possible. For example, the threshold can be 0.02. In an example, the threshold can be a value that is around 0.015.

At 508, the technique 500 can generate a random noise. The value of the random noise can be generated based on the energy level of the frame immediately preceding the current frame. That is, the value of the random noise can be related to the noise level of the immediately preceding frame. If the energy of the immediately preceding frame level is very low (i.e., if the signal contained in the previous frame is weak), then a comfort noise that is a random noise with an energy level that is below the energy level of the previous frame is generated. In an example, the random noise can be 40 db below the energy in the previous frame (i.e., the energy level of the previous frame).

At 516, the technique 500 adds the random noise to the current frame 514, which is inferred by the ML model (i.e., the frame portion 418 of FIG. 4 or the output of 316 of FIG. 3) to produce a new predicted frame.

At 506, the technique 500 calculates the LPC coefficients and residual signal of the immediately preceding frame. As is known, given a frame of P samples, LPC produces a model that can be used to predict the frame. More specifically, based on the first M samples of the frame, LPC obtains a set of coefficients. A respective prediction is generated for each of the remaining P-M samples as a linear combination of the coefficients and the M samples. LPC then calculates a respective error for each of the P-M samples as a difference between the sample prediction and the sample itself. The respective errors are referred to, collectively, as the residual or the exciting noise.

At 510, the technique 500 obtains a random residual based on the residual calculated at 506. The random residual can be the comfort noise that is added to the current frame 514. The random residual can be such that it has the same energy as the previous frame residual (i.e., the residual obtained at 508). In an example, the random residual can be obtained by obtaining a random permutation of the LPC coefficients obtained at 508. That is, when (at 504) the signal contained in the previous frame is strong, LPC is performed to decompose the previous voice into coefficients and residue. The residue is then used to create the noise signal.

At 512, frequency band fading is performed on the random residual to suppress high frequency noise resulting from the random residual to obtain a new predicted frame at 516. The frequency band fading can be applied to current random residual noise. For example, if the random residual noise is created as described with respect to block 506 of FIG. 5, the random residual may include an undesired high-band sound. Thus, band fading can be performed to reduce the high-frequency coefficients of the random noise.

Figure 6:
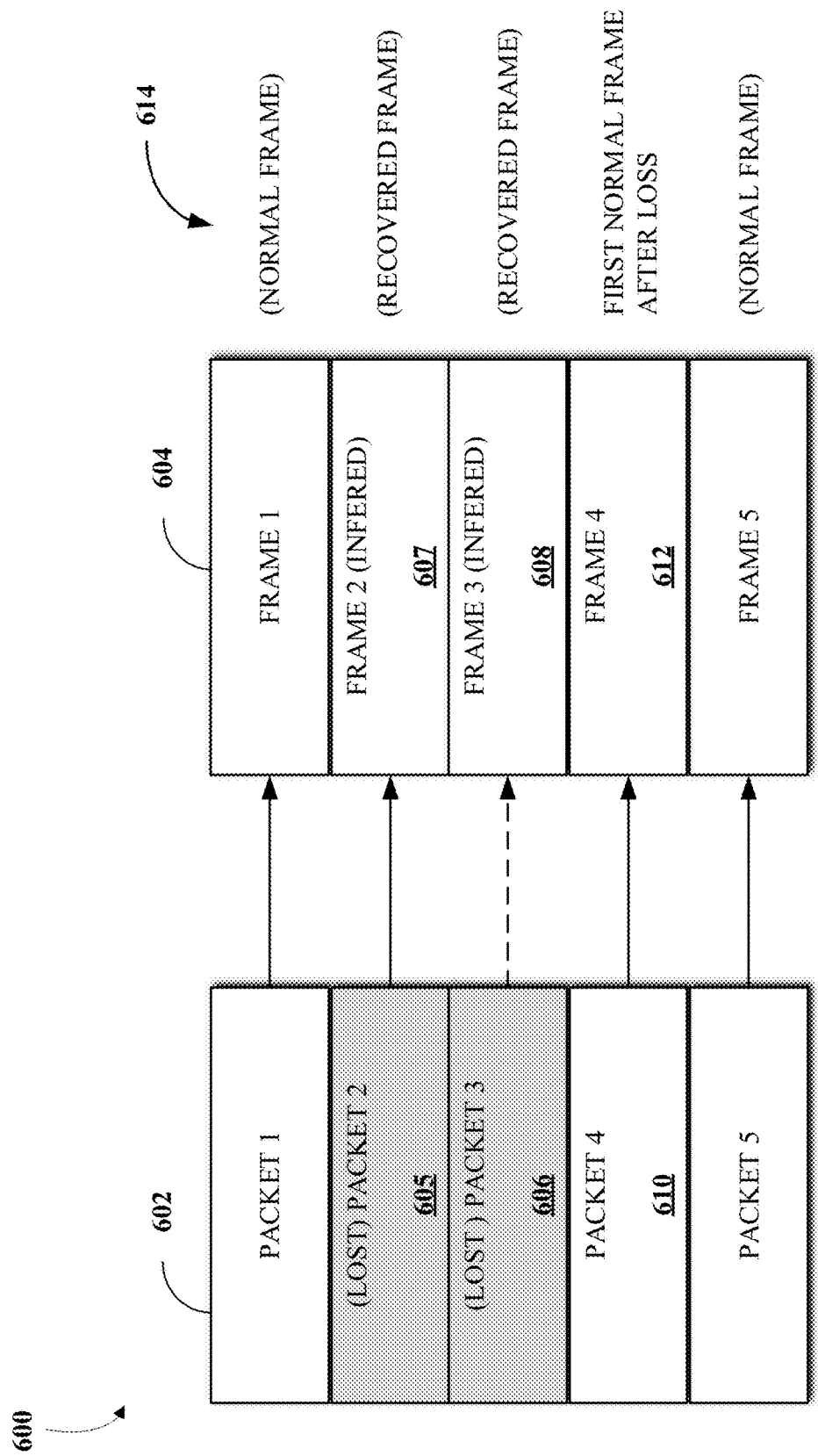
FIG. 6 is a diagram illustrating a packet buffer and a playout buffer in accordance with implementations of this disclosure.

FIG. 6 is a diagram 600 illustrating a packet buffer 602 and a playout buffer 604 in accordance with implementations of this disclosure. The packet buffer 602 can be the packet buffer 108 of FIG. 1 and the playout buffer 604 can be the playout buffer 110 of FIG. 1.

As mentioned above, when packets of an audio stream are first received, they are first placed in the packet buffer 602. A decoder (i.e., an audio decoder) can then decode the packets in the packet buffer 602 to obtain corresponding frames. For example, the received PACKET 1 is decoded to obtain FRAME 1; the received PACKET 4 (i.e., a packet 610) is decoded to obtain FRAME 4 (i.e., a frame 612); and the received PACKET 5 is decoded to obtain FRAME 5. However, FIG. 6 illustrates that a packet 605 (i.e., PACKET 2) and a packet 606 (i.e., PACKET 3) are lost, as indicated by the shading. As such, and as described with respect to FIG. 3, a predicted frame 607 (i.e., FRAME 2) and a predicted frame 608 (i.e., FRAME 3) are inferred using a ML model, which can be as described herein.

The frame 608 is indicated as being a "RECOVERED FRAME," or as having a PLC state 614 of "RECOVERED FRAME." The frame 612, which was not inferred for a lost packet, and which immediately follows a recovered frame (i.e., the frame 608) is indicated as being a "FIRST NORMAL FRAME AFTER LOSS," or as having a PLC state 614 of "FIRST NORMAL FRAME AFTER LOSS." The other frames are indicated as being "NORMAL FRAMEs" or as having a PLC state 614 of "NORMAL FRAME."

Figure 7:
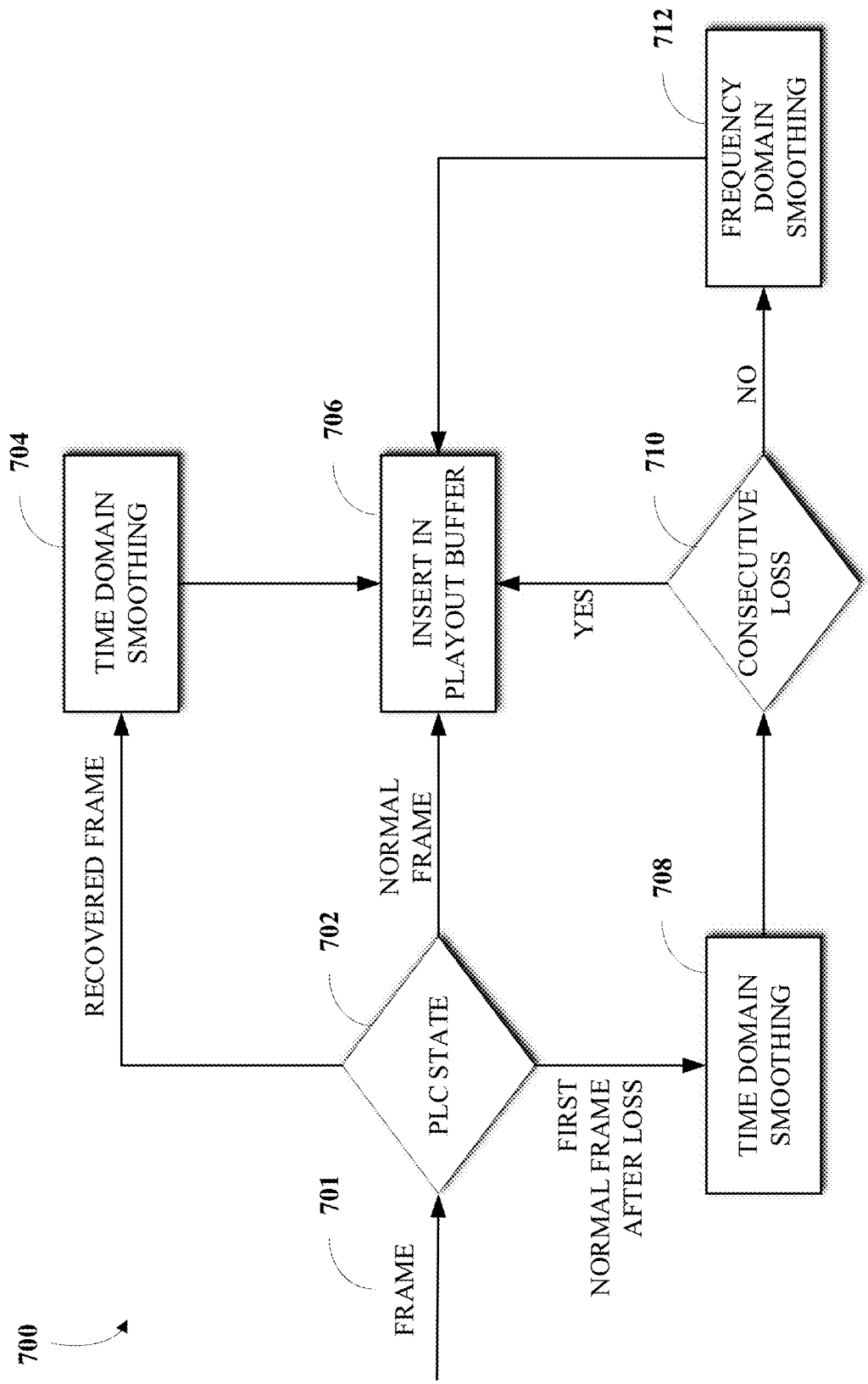
FIG. 7 is a diagram of a flowchart of a technique for updating a playout buffer in accordance with implementations of this disclosure.

FIG. 7 is a diagram of a flowchart of a technique 700 for updating a playout buffer in accordance with implementations of this disclosure. The technique 700 can be used at 308 of FIG. 3. As mentioned above, with respect to FIG. 6, after frames are decoded from received packets, the frames are inserted into the playout buffer. In case of packet loss, the technique 700 can be performed to smooth out some frames. While inserting a frame into the playout buffer, different smoothing processes can be selected according to a PLC state of the frame to be inserted into the playout buffer.

While the technique 700 describes an implementation of smoothing in the time domain and/or the frequency domain depending on the respective PLC states of frames, other implementations can always perform both time- and frequency-domain smoothing on recovered frames, and yet other implementations may always perform time-domain smoothing without frequency-domain smoothing.

In an example, three distinct PLC states can be associated with a frame. As described with respect to FIG. 6, the PLC states can be "RECOVERED FRAME," "FIRST NORMAL FRAME AFTER LOSS," and "NORMAL FRAME."

For a frame 701 to be inserted in the playout buffer, the technique 700 tests, at 702, the PLC state associated with the frame 701. If the PLC state is "RECOVERED FRAME," the technique 700 proceeds to 704. If the PLC state is "NORMAL FRAME," the technique 700 proceeds to 706. If the PLC state is "FIRST NORMAL FRAME AFTER LOSS," the technique 700 proceeds to 708.

At 704, the technique 700 performs time-domain smoothing. In an example, time-domain smoothing can be as described below with respect to FIG. 8. A PLC state of "RECOVERED FRAME" indicates that the coming frame is a recovered frame (i.e., the frame 701) is generated according to the teachings herein, such as by the technique 300 of FIG. 3. The frame 701 is smoothed with the immediately preceding frame.

At 706, no smoothing is applied and the frame 701 is inserted as is in the playout buffer. The PLC state of "NORMAL FRAME" implies that the frame 701 and the immediately preceding frame are both from the decoder. The frame 701 can be inserted into playout buffer directly without any modification.

A PLC state of "FIRST NORMAL FRAME AFTER LOSS" signifies that the frame 701 is from the decoder whereas the immediately preceding frame is estimated using an ML model as described with respect to FIG. 3. If recent packet loss status is "consecutive loss" (i.e., more than one immediately preceding packets are lost before the frame 701), the frame 701 is smoothed with the immediately preceding frame in the time domain; and the frame that precedes the frame 701 is smoothed in the frequency domain. In contrast, if recent packet loss status is discontinuous loss, only time domain smoothing is applied to the frame 701.

As such, at 708, the technique 700 first applies time-domain smoothing, which can be as the time-domain smoothing at 704. The technique 700 smoothes, in the time-domain, the frame 701 with the immediately preceding frame. To illustrate, and referring to FIG. 6, if the frame 701 is the frame 612 of FIG. 6, then at 708, the frame 612 is smoothed with the frame 608.

Additionally, if the technique 700 determines, at 710, that at least 2 immediately preceding frames were recovered frames, then, at 712, the technique 700 also applies frequency-domain smoothing. Frequency-domain smoothing is described with to FIG. 9.

FIG. 8 is a diagram of a flowchart of a technique 800 for time-domain smoothing in accordance with implementations of this disclosure. Time-domain smoothing can be used to reduce mismatch between the current frame and the immediately preceding frame. A mismatch refers to a gap in the waveform resulting in a discontinuous audio stream. Thus, the time-domain smoothing can make the waveform continuous. A smoothing filter can be applied to the junction of the two frames (i.e., the current frame and the immediately preceding frame) to reduce any amplitude gaps. Once a sequence is given, the smoothing filter can adjust each value in the sequence based on their adjacent values.

The last N points (i.e., samples) out all P samples of the immediately preceding frame (i.e., a previous frame 802) and the first N samples out of the P samples of the current frame 804 can be input to a smoothing filter 806. In an example, the smoothing filter can be a Savitzky-Golay filter. The Savitzky-Golay filter uses convolution to smooth the input data. Other smoothing filters are possible. The filter 806 outputs smoothed last N points of the previous frame 802 and smoothed first N points of the current frame 804. In an example, P can be 11. However, other values of P are possible. In an example, assuming that a frame corresponds to 20 milliseconds of audio and that the sampling rate is 8,000 Hz, then the frame contains N=160 points.

A new previous fame 810 (i.e., a new immediately preceding frame) is obtained by assembling the smoothed last N points with the other P-N samples of the previous frame. Alternatively, the new previous frame can be obtained by replacing the last N points with the smoothed last N points. In either case, the new previous frame replaces the previous frame in the playout buffer.

A new current fame 812 is obtained by assembling the smoothed first N points with the other P-N samples of the current frame. Alternatively, the new current frame can be obtained by replacing the first N points with the smoothed first N points. The mew current frame is inserted into the playout buffer.

Figure 9:
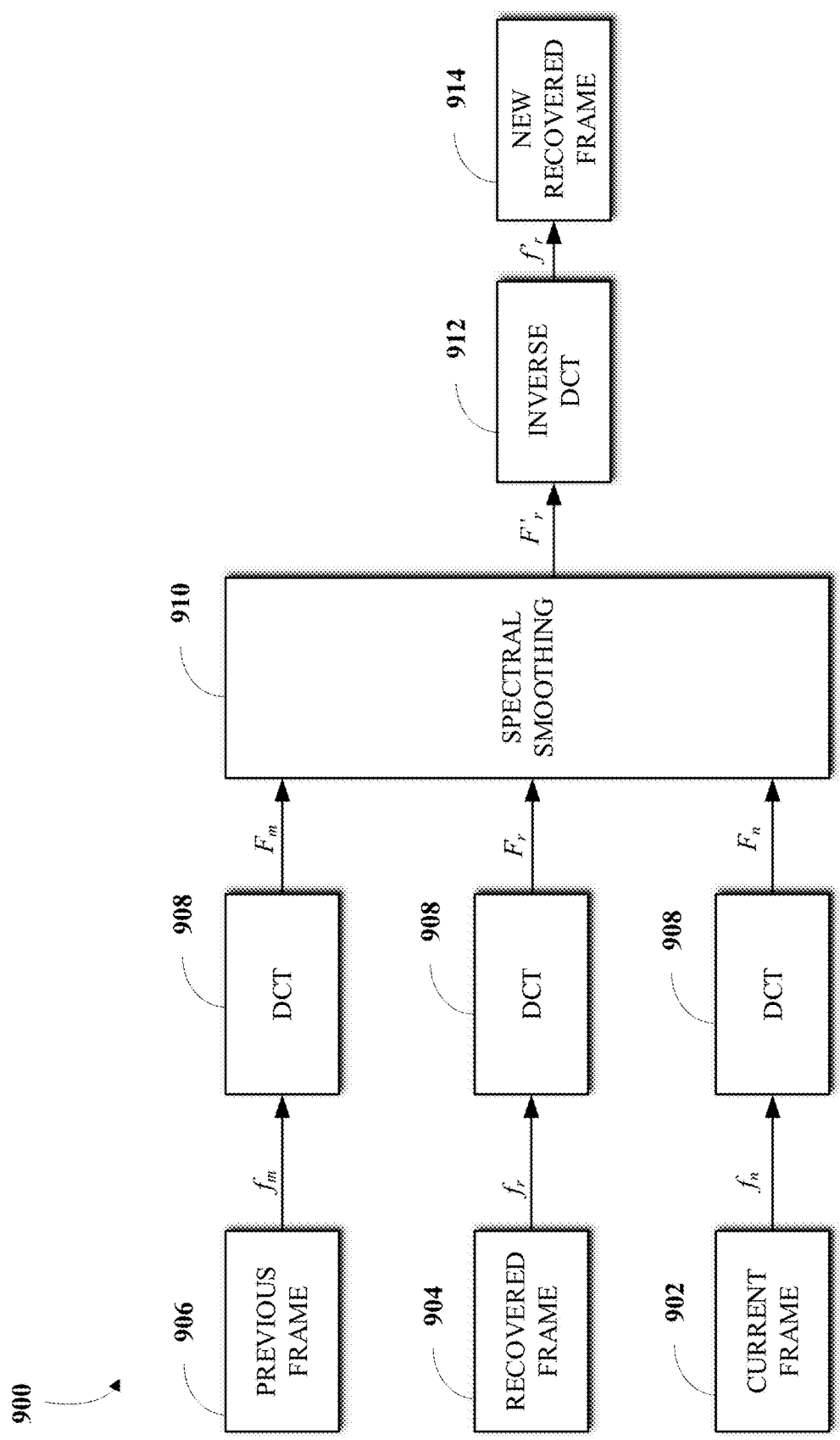
FIG. 9 is a diagram of a flowchart of a technique for frequency-domain smoothing in accordance with implementations of this disclosure.

FIG. 9 is a diagram of a flowchart of a technique 900 for frequency-domain smoothing in accordance with implementations of this disclosure. In frequency-domain smoothing, frames are converted to the frequency domain to obtain respective transform (i.e., spectrum) coefficients. The coefficients of one of the frames can be adjusted (i.e., smoothed) as described below, based on the coefficients of the other frames. The smoothed coefficients are converted back (via an inverse transform operation) to the time-domain to obtain a new frame. In an example, the Discrete Cosine Transform (DCT) can be used. However, other transform types can be used.

Similar to the time-domain smoothing described above with respect to FIG. 8, frequency-domain smoothing can also result in improved (i.e., smoothed) voice fluency. As mentioned above, the technique 900 can only be activated when consecutive packet loss takes place.

Referring to FIG. 6 to illustrate, the technique 900 can be performed when the current frame is the frame 612. This is so because a consecutive loss was detected. Specifically, the frame 612 is the FIRST NORMAL FRAME AFTER A LOSS and the loss included more than immediately preceding recovered frames; namely, the frame 608 and the frame 607 are both recovered frames (i.e., frames recovered using the ML model described with respect to FIG. 3). The technique 900 can smooth the frame 608 in the frequency domain.

Let r denote a recovered frame 904 (e.g., the frame 608 of FIG. 5); let m denote a previous frame 906 (e.g., the frame 607 of FIG. 5); and let n denote a current frame 902 (e.g., the frame 612 of FIG. 5). Each of the frames 902, 904, 906 is converted to the frequency domain using a transform type 908, such as the DCT, to obtain respective spectrum coefficients, $F_n$, $F_r$, and $F_m$. Smoothing can be performed by a spectral smoothing filter 910 according to formula (1) to obtain smoothed coefficients (i.e., spectra) $F_r'$ for the recovered frame.

$$F_r'(k)=\alpha*F_m(k)/2+(1-\alpha)*F_r(k)+\alpha*F_n(k)/2 \quad 0<\alpha<1,$$
$$k=0,1,\ldots l \qquad (1)$$

In formula (1), $F_r(k)$, $F_m(k)$, and $F_n(k)$ denote the spectrum coefficients of the recovered frame r, previous frame m, and current frame n, respectively; l is equal to the frame length, in samples; and α can be a configurable smoothness factor, which can have a value between 0 and 1.

At 912, the smoothed spectra, $F_r'$, are transformed back (using an inverse transform, such as the iDCT) to the time domain to obtain $f_r'$ of a new recovered frame 914. The new recovered frame 914 replaces the recovered frame 904 in the playout buffer.

Figure 10:
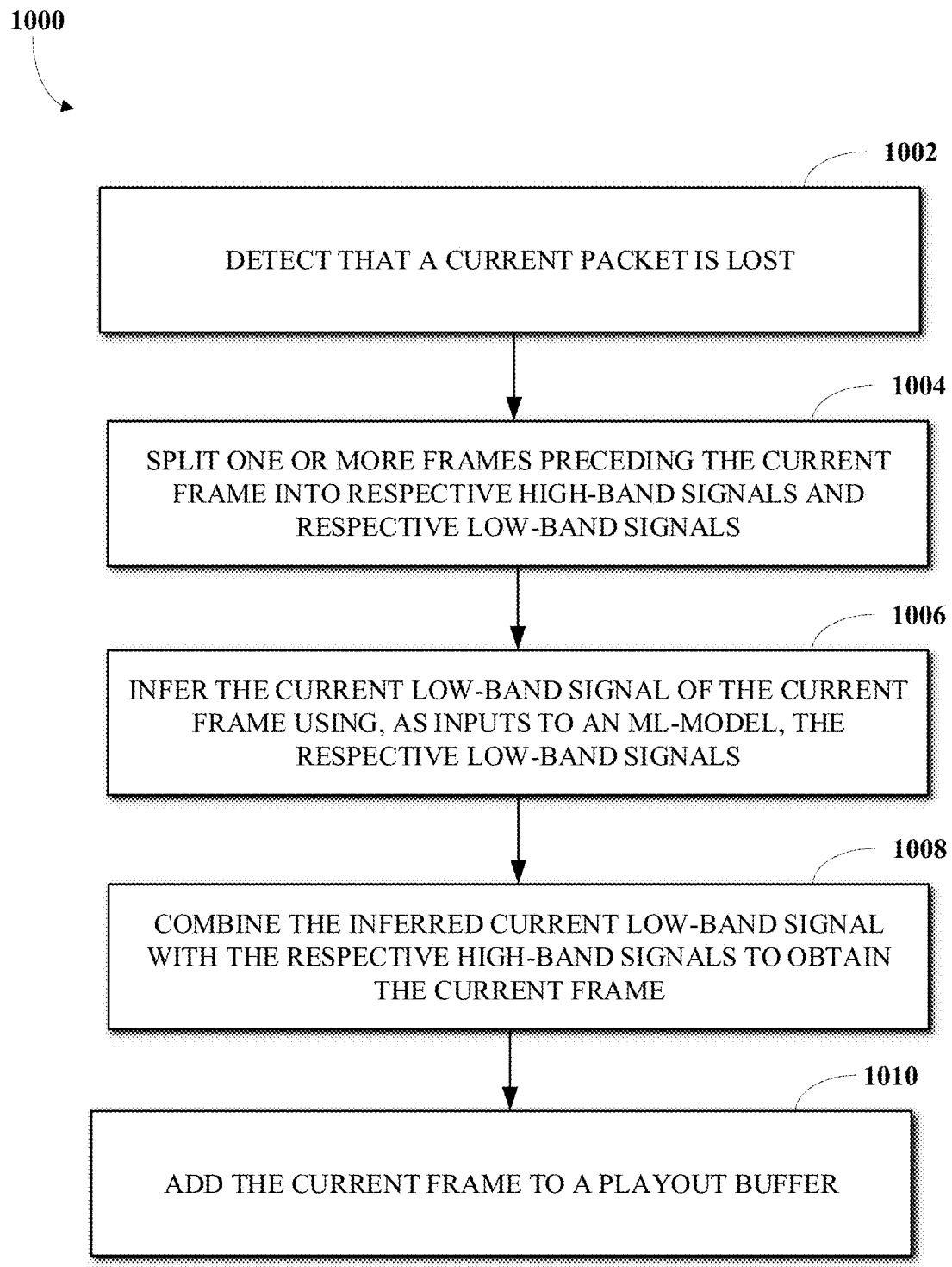
FIG. 10 is a diagram of a flowchart of a technique for recovering a current frame of an audio stream in accordance with an implementation of this disclosure.

FIG. 10 is a diagram of a flowchart of a technique 1000 for recovering a current frame of an audio stream in accordance with an implementation of this disclosure. The technique 1000 can be implemented by a receiving station, such as the receiving station 106 of FIG. 1. The technique 1000 can be implemented by a PLC module, such as the PLC module 112 of FIG. 1. The technique 1000 can be implemented by a computing device, such as the computing device, such as the computing device 200 of FIG. 2. The technique 1000 can be stored as executable instructions in a memory, such as the memory 204 of FIG. 2. The executable instructions can be executed by a processor, such as the processor 202 of FIG. 2, to implement the steps of the technique 1000. The technique 1000 can be implemented as one or more hardware modules that can be configured to execute one or more of the steps of the technique 1000.

At 1002, the technique 1000 detects that a current packet is lost. The current packet includes an audio signal that is a portion of the audio stream. The current packet, if it weren't lost, would have been decoded by a decoder, to generate a current frame. As such, a frame corresponding to the current lost packet is referred to as the current frame. In an example, the current packet can be detected to be lost as described above with respect to 304 of FIG. 3.

At 1004, the technique 1000 splits one or more frames into respective high-band signals and respective low-band signals. The one or more frames can precede the current frame in the audio stream. The one or more frames can be available in a playout buffer, such as the playout buffer 110 of FIG. 1 or the playout buffer 604 of FIG. 6. In an example, the one or more frames includes two frames. To illustrate, if, for example, the current (i.e., lost) packet is the packet 606 of FIG. 6, then the one or more frames can include the FRAME 2 (i.e., the frame 607) and FRAME 1 of FIG. 6. In an example, the technique 1000 can split the one or more frames into respective high-band signals and respective low-band signals as described with respect to 314 of FIG. 3. As such, the technique 1000 can split the one or more frames using a Quadrature Mirror Filter (QMF).

At 1006, the technique 1000 infers a current low-band signal of the current frame using, as inputs to a machine-learning (ML) model, the respective low-band signals. Inferring the current low-band signal can be as described with respect to 316 of FIG. 3. The ML model can be as described above.

At 1008, the technique 1000 combines the inferred current low-band signal with the respective high-band signals to obtain the current frame. The combining can be as described with respect to 320 of FIG. 3. As such, inverse QMF (iQMF) can be used for the combining.

At 1010, the technique 1000 adds the current frame to the playout buffer.

The one or more frames includes an immediately preceding frame to the current frame. To illustrate, if the current frame is the frame 608 of FIG. 6, then the immediately preceding frame can be the frame 607 of FIG. 6. In an example, and as described with respect to FIG. 5, the technique 1000 can include calculating an energy value of the immediately preceding frame; and adding noise to the current frame based on the energy value.

The energy value can be compared to a threshold. In an example, the threshold can be 0.015. If the energy is less than the threshold, then a random noise can be added to the current frame, as described with respect to 508 and 516 of FIG. 5. If the energy is greater than or equal to the threshold, and as described with respect to FIG. 5, the technique 1000 can include calculating a learner prediction code (LPC) of the immediately preceding frame; calculating a residual of the immediately preceding frame; generating a random residual having a same energy as an energy of the immediately preceding frame; and adding the random residual to the current frame.

In an example, the technique 1000, when adding the random residual to the current frame, can suppress the high frequency noise in the random residual, as described with respect to frequency band fading of 512 of FIG. 5.

The audio stream can include the current frame and an immediately preceding frame. For example, the current frame can be the frame 608 and the immediately preceding frame can be the frame 607 of FIG. 6. The technique 1000 can time-domain smooth (i.e., smooth in the time domain) the current frame and the immediately preceding frame. The time-domain smoothing can be as described with respect to FIG. 8.

As mentioned above, in the case of successive packet loss, time- and frequency-domain smoothing can be performed. As such, the current and the immediately preceding frame can both be recovered frames from corresponding lost packets, such the packets 605 and 606 of FIG. 6. When an immediately succeeding frame (e.g., the frame 612 of FIG. 6) is not recovered from a lost packet (i.e., the frame 612 has a PLC state of FIRST NORMAL FRAME AFTER LOSS), then when the technique 1000 processes the frame 612, the technique 1000 smoothes the current frame (i.e., the frame 608) in the time domain with the immediately succeeding frame; and in the frequency domain with the preceding and the succeeding frames. Frequency domain smoothing can be as described with respect to FIG. 9. As such, the technique 1000 smoothes, in the frequency domain, the current frame based on the immediately succeeding frame and the immediately preceding frame.

Said another way, a previous frame (e.g., the frame 607 of FIG. 6) is received immediately before the current frame (e.g., the frame 608 of FIG. 6); a new frame (e.g., the frame 612 of FIG. 6) is received immediately subsequent to the current frame (e.g., the frame 608 of FIG. 6), the new frame is a FIRST NORMAL FRAME AFTER LOSS frame meaning that it is not recovered from a corresponding lost packet but that it comes immediately after a recovered frame. On a condition that the previous frame is inferred using the machine-learning model, apply time-domain and frequency domain smoothing to the current frame; and on a condition that the previous frame is not inferred using the machine-learning model, apply time-domain smoothing to the new frame.

With respect to smoothing in the time-domain, and as described above, the current frame can include a first sequence of audio samples and the immediately preceding frame can include a second sequence of audio samples. Thus, time-domain smoothing the current frame can include smoothing a first subset of the first sequence of audio samples with a second subset of the second sequence of audio samples. The first subset includes a first N number of samples of the first sequence of audio samples and the second subset includes a last N number of samples of the second sequence of audio samples, where N is a positive integer.

For simplicity of explanation, the techniques 300, 500, 700, 800, 900, and 1000 are each depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in an audio conferencing system, which may be part of, or work in conjunction with, a video conferencing system. Alternatively, the transmitting station 102 can be implemented on a server, and the receiving station 106 can be implemented on a device separate from the server, such as a handheld communications device. In this instance, the transmitting station 102 can encode content into an encoded audio signal and transmit the encoded audio signal to the communications device. In turn, the communications device can then decode the encoded audio signal. Other suitable transmitting and receiving implementation schemes are available. For example, the receiving station 106 can be a generally stationary personal computer rather than a portable communications device.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for recovering a current frame of an audio stream, comprising:
   detecting that a current packet of the audio stream is lost;
   recovering the current frame corresponding to the current packet using a machine-learning model;
   adding noise to the current frame based on an energy level in a previous frame that immediately precedes the current frame in the audio stream;
   smoothing the current frame in at least one of a time-domain or a frequency domain, further comprising:
      on a condition that the previous frame is inferred using the machine-learning model, apply time-domain and frequency domain smoothing to the current frame; and
      on a condition that the previous frame is not inferred using the machine-learning model, apply time-domain smoothing to the current frame.

2. The method of claim 1,
   wherein the energy value level is below a threshold, and
   wherein adding the noise to the current frame comprising:
      adding a random noise to the frame.

3. The method of claim 1,
   wherein the energy level is above or equal to a threshold, and
   wherein adding the noise to the current frame comprising:
      calculating a learner prediction code (LPC) of the previous frame that immediately precedes the current frame;
      calculating a residual of the previous frame that immediately precedes the current frame;
      generating a random residual having a same energy as an energy of the previous frame that immediately precedes the current frame; and
      adding the random residual to the current frame.

4. The method of claim 3, wherein adding the noise to the current frame further comprising:
   suppressing high frequency noise in the random residual.

5. The method of claim 1,
   wherein the audio stream comprises the current frame and the previous frame that immediately precedes the current frame, and
   wherein the method further comprising:
      time-domain smoothing the current frame and the previous frame that immediately precedes the current frame.

6. The method of claim 5,
   wherein the previous frame that immediately precedes the current frame is recovered from a lost packet,
   wherein the audio stream comprises an immediately succeeding frame to the current frame,
   wherein the immediately succeeding frame is not recovered from another lost packet, and
   the method further comprising:
      time-domain smoothing the current frame and the previous frame that immediately precedes the current frame; and
      frequency-domain smoothing the current frame based on the immediately succeeding frame and the previous frame that immediately precedes the current frame.

7. The method of claim 6,
   wherein the current frame comprising a first sequence of audio samples and the previous frame that immediately precedes the current frame comprising a second sequence of audio samples, and wherein time-domain smoothing the current frame and the previous frame that immediately precedes the current frame comprising:
smoothing a first subset of the first sequence of audio samples with a second subset of the second sequence of audio samples.

8. The method of claim 7,
wherein the first subset comprising a first N number of samples of the first sequence of audio samples,
wherein the second subset comprising a last N number of samples of the second sequence of audio samples, and
wherein N is a positive integer.

9. An apparatus for recovering a current frame of an audio stream, comprising:
a memory; and
a processor, the processor configured to execute instructions stored in the memory to:
detect that a current packet is lost, the current packet comprising an audio signal of the audio stream;
split one or more frames preceding the current frame into respective high-band signals and respective low-band signals, wherein the one or more frames comprises an immediately preceding frame to the current frame;
infer a current low-band signal using the respective low-band signals associated with the one or more frames as inputs to a machine-learning model;
combine the inferred current low-band signal with the respective high-band signals associated with the one or more frames to obtain the current frame;
calculate an energy value of the immediately preceding frame, wherein the energy value is above or equal to a threshold;
add noise to the current frame based on the energy value, wherein adding the noise to the current frame comprising:
calculating a learner prediction code (LPC) of the immediately preceding frame;
calculating a residual of the immediately preceding frame;
generating a random residual having a same energy as an energy of the immediately preceding frame; and
adding the random residual to the current frame; and
add the current frame to a playout buffer.

10. The apparatus of claim 9, wherein the instructions further comprise instructions to:
receive the previous frame, wherein the previous frame is received immediately before the current frame;
receive a new frame, wherein the new frame is not recovered from a corresponding lost packet, and wherein the new frame is received immediately subsequent to the current frame;
on a condition that the previous frame is inferred using the machine-learning model, apply time-domain and frequency domain smoothing to the current frame; and
on a condition that the previous frame is not inferred using the machine-learning model, apply time-domain smoothing to the new frame.

11. An apparatus for recovering a current frame of an audio stream, the apparatus configured to:
detect that a current packet is lost;
recover the current frame corresponding to the current packet using a machine-learning model;
add noise to the current frame based on an energy level in a previous frame that immediately precedes the current frame in the audio stream; and
smooth the current frame in at least one of a time-domain or a frequency domain, further comprising:
on a condition that the previous frame is inferred using the machine-learning model, apply time-domain and frequency domain smoothing to the current frame; and
on a condition that the previous frame is not inferred using the machine-learning model, apply time-domain smoothing to the current frame.

12. The apparatus of claim 11, wherein to recover the current frame corresponding to the current packet using the machine-learning model comprises to:
split one or more frames preceding the current frame into respective high-band signals and respective low-band signals; and
use the respective low-band signals as inputs to the machine-learning model to obtain a current low-band signal of the current frame.

13. The apparatus of claim 12, wherein the apparatus further configured to:
combine the current low-band signal with the respective high-band signals to obtain the current frame.

14. The apparatus of claim 12, wherein the machine-learning model is a recurrent neural network comprising 3 simple recurrent units layers, 2 normalization layers, and an output layer.

15. The apparatus of claim 11, wherein the energy level in the previous frame is calculated as a sum of squares of samples of the previous frame.

16. The method of claim 1, further comprising:
splitting one or more frames into respective high-band signals and respective low-band signals, wherein the one or more frames precede the current frame in the audio stream; and
inferring a current low-band signal of the current frame using, as inputs to a machine-learning model, the respective low-band signals associated with the one or more frames.

17. The method of claim 16, further comprising:
combining the inferred current low-band signal with the respective high-band signals associated with the one or more frames to obtain the current frame.

18. The method of claim 17,
wherein the splitting uses a Quadrature Mirror Filter (QMF), and
wherein the combining uses an inverse of the QMF (iQMF).

19. The apparatus of claim 9,
wherein the splitting uses a Quadrature Mirror Filter (QMF), and
wherein the combining uses an inverse of the QMF (iQMF).

20. A non-transitory computer-readable storage medium configured to store computer programs for recovering a current frame of an audio stream, the computer programs comprising instructions executable by a processor to carry out the method of claim 1.

* * * * *